(12) United States Patent
Martin

(10) Patent No.: US 7,246,237 B2
(45) Date of Patent: Jul. 17, 2007

(54) METHOD AND DEVICE FOR THE GENERATION OF SEVERAL CHANNELS IN AN IFF TYPE SYSTEM

(75) Inventor: Jean-Claude Martin, Marnes la Coquette (FR)

(73) Assignee: Thales, Paris (FR)

( * ) Notice: Subject to any disclaimer, the term of this patent is extended or adjusted under 35 U.S.C. 154(b) by 855 days.

(21) Appl. No.: 10/237,701

(22) Filed: Sep. 9, 2002

(65) Prior Publication Data

US 2003/0048832 A1 Mar. 13, 2003

(30) Foreign Application Priority Data

Sep. 7, 2001 (FR) .................................. 01 11618

(51) Int. Cl.
*H04L 9/00* (2006.01)
(52) U.S. Cl. ................ 713/168; 375/130; 342/42; 342/45
(58) Field of Classification Search ................ 713/170, 713/168, 160; 342/45; 375/130
See application file for complete search history.

(56) References Cited

U.S. PATENT DOCUMENTS

| | | | | |
|---|---|---|---|---|
| 3,277,466 | A * | 10/1966 | Gardner ........................ 342/45 |
| 3,949,397 | A * | 4/1976 | Wagner et al. ................ 342/45 |
| 4,222,115 | A * | 9/1980 | Cooper et al. .............. 375/130 |
| 4,814,769 | A * | 3/1989 | Robin et al. .................. 342/45 |
| 5,001,751 | A * | 3/1991 | Sanford et al. ............... 342/45 |
| 5,426,434 | A * | 6/1995 | Bishop ......................... 342/45 |
| 5,459,470 | A * | 10/1995 | Wootton et al. .............. 342/45 |
| 5,796,362 | A * | 8/1998 | Ayasli et al. ................... 342/6 |
| 5,809,060 | A * | 9/1998 | Cafarella et al. ........... 375/146 |
| 5,822,430 | A * | 10/1998 | Doud ......................... 380/260 |
| 6,084,530 | A * | 7/2000 | Pidwerbetsky et al. .. 340/10.32 |
| 6,522,683 | B1 * | 2/2003 | Smee et al. ................. 375/144 |
| 6,928,285 | B2 * | 8/2005 | Hunzinger ................... 455/438 |

FOREIGN PATENT DOCUMENTS

FR 2 632 421 12/1989

* cited by examiner

*Primary Examiner*—Nasser Moazzami
*Assistant Examiner*—Fikremariam Yalew
(74) *Attorney, Agent, or Firm*—Oblon, Spivak, McClelland, Maier & Neustadt, P.C.

(57) ABSTRACT

A method of interrogation/response in an IFF type Mode 5 communications system comprises at least the following steps: modulating the header of an interrogation message by using an orthogonal or substantially orthogonal function; detecting the modulation function used for the header and determining the algorithm for the decoding of the information contained in the message. The modulation function is a 16-bit Walsh sequence.

8 Claims, 2 Drawing Sheets

METHOD AND DEVICE FOR THE GENERATION OF SEVERAL CHANNELS IN AN IFF TYPE SYSTEM

BACKGROUND OF THE INVENTION

1. Field of the Invention

The present invention relates to a method and device for generating or creating interrogation channels or modes in an IFF (Identification Friend or Foe) type system using spread-spectrum waveforms.

The invention can be applied especially in IFF identification systems used in military aviation working in Mode 5. Mode 5 is an encrypted interrogation/response mode using a waveform defined in part V of the NATO standardization agreement, STANAG 4193, and its own enciphering algorithm. FIG. 2 recalls the structure of this waveform.

Hereinafter in the description, the term "channel" designates an encrypted interrogation/response mode implemented in the IFF question-and-answer identification systems using Mode 5 but using different enciphering algorithms.

2. Description of the Prior Art

At present, there are no means of differentiating between the messages when several enciphering algorithms are used simultaneously or again when different enciphering keys are used simultaneously for one and the same enciphering algorithm.

An interrogator chooses to interrogate with a given enciphering algorithm A or with specific keys (Algo A). A responder does not know the algorithm or the key with which the messages that it receives are enciphered There are then various possibilities:

- if the responder is equipped only with the algorithm A, it will decipher the interrogation message and respond.
- If the responder is equipped only with the algorithm B (Algo B) which is different from the algorithm A, it will not be able to respond to the interrogations but its cryptographic computer will be used to try and decipher the message with the algorithm A.
- when the responder is equipped with the algorithms A and B, it will have to process the messages with both algorithms, either in parallel or serially, if the processing times permit it. It will respond with the algorithm that will have given a comprehensible and valid interrogation message.

The idea of the present invention consists especially in creating independent channels by which it is possible to have, simultaneously, several types of enciphering algorithms or several different keys for one and the same enciphering algorithm and by which the system can process the messages without resorting to parallel or serial processing operations. The system has the possibility of recognizing the different messages whatever the enciphering algorithm or the enciphering keys used and of determining the algorithm to be used to decrypt the interrogations and the responses.

To this end, the symbols of the interrogation message header are modulated and the responder, by detecting the modulation of the header, knows which algorithm or which key has been used.

The interrogations made with an algorithm A do not disturb a responder that is not equipped with the algorithm A. In fact, the two interrogation/response modes, namely the algorithm A and the algorithm B, implemented in the interrogator-responder system ignore each other and do not disturb each other. This actually prevents additional processing operations and prevents the computer from being kept unnecessarily busy.

SUMMARY OF THE INVENTION

The invention relates to a method of interrogation/response in an IFF type (Mode 5) communications system comprising at least the following steps:

modulating the header of an interrogation message by using an orthogonal or substantially orthogonal function, detecting the modulation function used for the header and determining the algorithm for the decoding of the information contained in the message.

The modulation or spread function is, for example, a 16-bit Walsh function.

The method is implemented for example in a system of identification using Mode 5 with different enciphering algorithms and/or different keys and Mode 4.

The invention also relates to a device for the generation of several channels in an IFF type interrogation/response system, comprising at least one means adapted to the modulation of the pulses of the header of a Mode 5 interrogation message by means of an orthogonal or quasi-orthogonal modulation and a means adapted to determining the spread function of the pulses of the header and the algorithm to decode the information contained in the message.

The device is adapted for example to the generation of a Walsh function type of modulation function.

The present invention has the following advantages in particular:

The transmission channels obtained are different depending on the algorithms, thus enabling the system to automatically recognize the algorithm that it must use to decrypt the interrogations and the responses, Several systems can thus work simultaneously with different enciphering algorithms without causing the systems in the vicinity to be kept unnecessarily busy, The encryption capacities of each channel may be increased by obtaining a variation in the modulation function used, for example the Walsh function as a function of time, A given transponder can receive simultaneously on several channels without requiring the processing of all the messages in parallel or sequentially on each channel, Since each channel is independent, it is possible to define specific messages for a given channel, thus augmenting the operational capacities of the systems, Since the Walsh sequence has the special feature of being specific to an algorithm and of being associated with possible changes in the header, the invention gives added security to the message, The Mode 4 interrogation/response mode implemented in present-day IFF systems uses a waveform with a four-pulse header without spread and corresponds to a channel according to the invention.

BRIEF DESCRIPTION OF THE DRAWINGS

Other features and advantages of the invention shall appear more clearly from the following description, given by way of an illustration that in no way restricts the scope of the invention, and made with reference to the appended figures, of which.

MORE DETAILED DESCRIPTION

Figure 1:
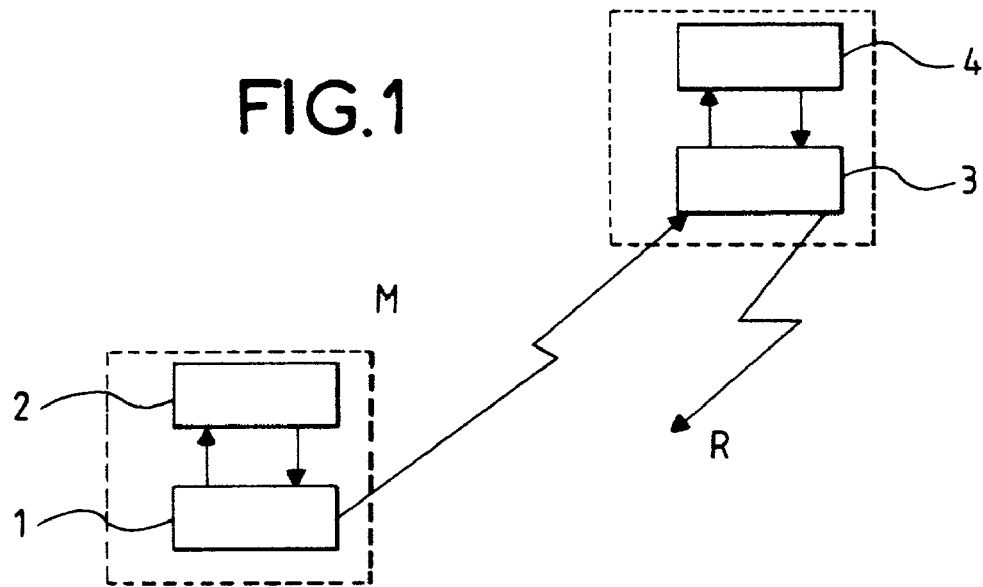
FIG. 1 exemplifies a structure for the exchange of interrogation/response messages in an IFF system.

FIG. 1 recalls the principle of interrogation/response in a system where the interrogation is made in a given encrypted mode for a responder of the same encrypted mode for example.

An IFF system comprising an interrogator 1 associated with a cryptography computer 2 interrogates a responder 3 by sending out an interrogation message M in Mode 5. The format of this interrogation message is shown in detail in FIG. 2. The responder 3 determines the Mode in which it is being interrogated, for example Mode 4 or Mode 5, along a known channel with or without the right keys. It then transmits the interrogation message M to the cryptography computer 4 with which it is linked. In the case of a valid interrogation, it sends a response message R to the interrogator.

A responder 3 is equipped, for example, with a specific interface adapted to responding in the interrogation mode only.

Different exemplary forms of architecture of IFF systems are given, for example, in Michael C. Stevens, "Secondary Surveillance Radar" Artech House, Boston, 1988.

Figure 2:
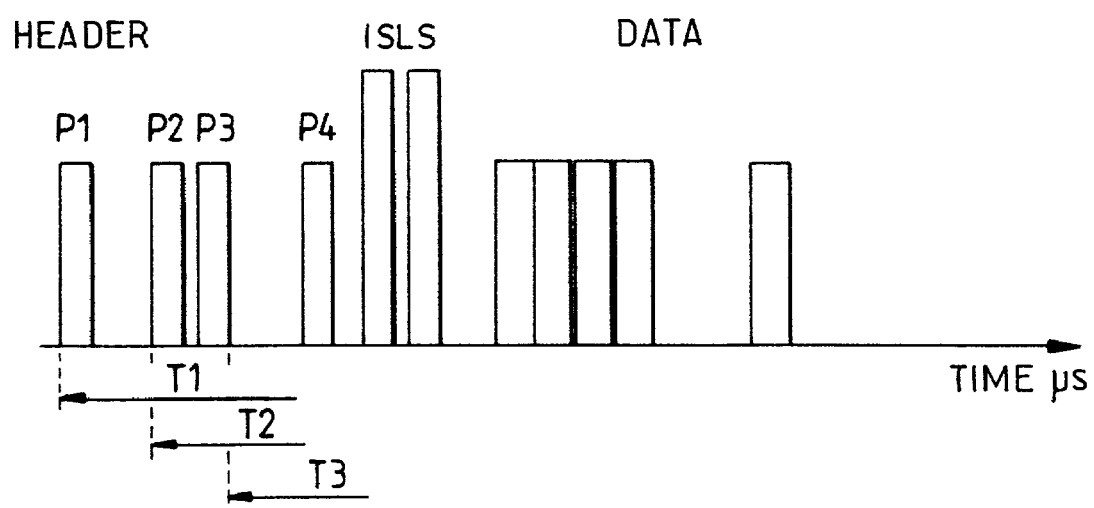
FIG. 2 shows the structure of a Mode 5 interrogation message without modulation.

FIG. 2 is a diagrammatic view of the format or structure of the Mode 5 interrogation message. It is formed by a group of four pulses $P_1$, $P_2$, $P_3$, $P_4$ followed by two optional interrogation side lobe suppression (ISLS) pulses and a group D of information pulses formed by pulses spread-modulated according to enciphered laws. The pulses of the header are spaced out in such a way that $T_1$ corresponds to the time difference between the two end pulses $P_1$ and $P_4$, $T_2$ to the difference between the pulses $P_4$ and $P_2$ and $T_3$ to the difference between the pulses $P_4$ and $P_3$.

Figure 3:
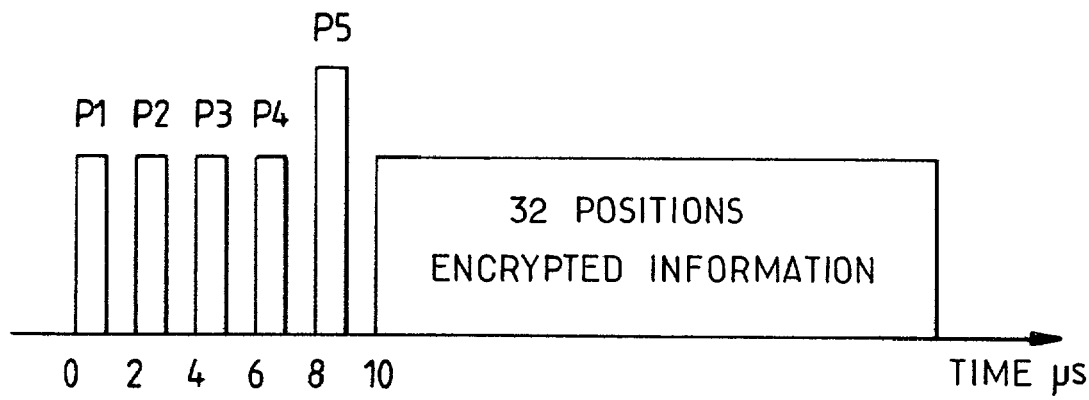
FIG. 3 shows the structure of a Mode 4 interrogation message, FIG. 4 exemplifies the structure of the header of the Mode 5 spread-modulated message.

FIG. 3 represents the structure of the Mode 4. This message is formed by a group of four pulses $P_1$, $P_2$, $P_3$ and $P_4$, followed by an interrogation side lobe suppression (ISLS) control pulse $P_5$ and a group of information pulses formed by 32 positions that may or may not be occupied by a pulse. All the pulses and positions are spaced out by 2 µs and each pulse lasts 0.5 µs, for example. The information group starts 10 µs after the first pulse $P_1$. In this group of 32 possible pulses, when the positions of contiguous pulses are unoccupied, anti-interference impulses or pulses (AII) are introduced at positions corresponding to odd-parity multiples of a microsecond. The first of these pulses may be at 9 µs from $P_1$.

Figure 4:
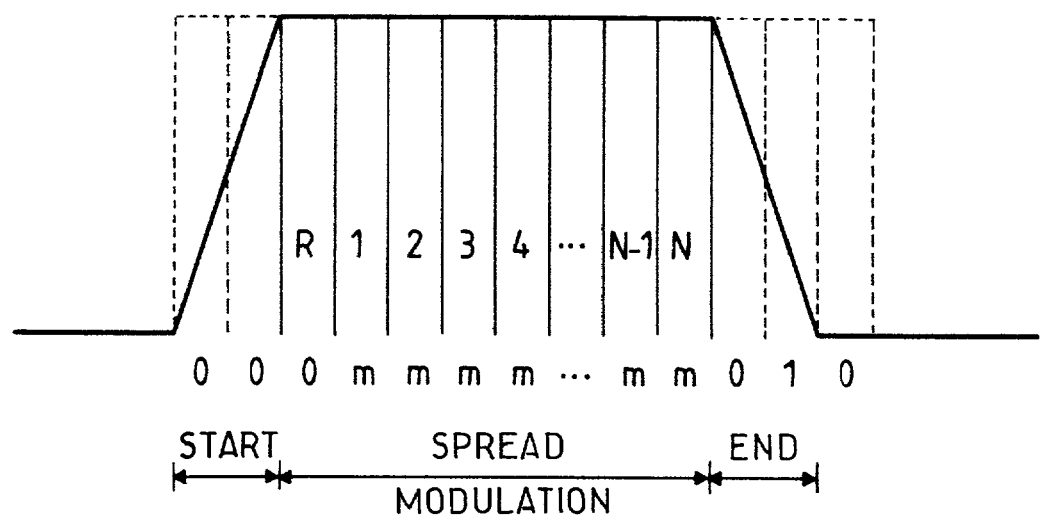

FIG. 4 gives a diagrammatic view of the pulses of the header modulated by orthogonal or quasi-orthogonal functions or again by Walsh functions known to those skilled in the art. These functions are chosen so as to create independent communications channels. The value of the spread sequence is defined for the purpose of interoperability. The sequences used are chosen so as to be as orthogonal as possible between the different channels.

The method comprises, for example, the following steps:
modulating the pulses of the header of the interrogation message by using Walsh functions or orthogonal or quasi-orthogonal functions in order to differentiate between the different channels, and
recognizing the spread sequence of the header of the message in order to determine, for example automatically, the algorithm to be implemented for the decoding of the information contained in the message.

For this second step, the device according to the invention comprises, for example, a processor provided with a software function or again a series of correlators positioned in parallel or in series.

The modulation of the four pulses of the header of the interrogation message by 16-bit Walsh functions generates distinct channels and enables the use, on each channel, of a different enciphering algorithm, with each channel using a different function.

The method may also comprise a step for the dynamic management and generation of the channels during the operation of the interrogation-response system. Depending on the needs of the interrogation-response system, it is possible to make the channels vary and to adapt them. The device is then equipped, for example, with a processor provided with a software program.

In the systems concerned by the invention, an interrogator chooses, for example, to interrogate in Mode 4 or in Mode 5 with a given channel. The responder is adapted to functioning with one or two modes and one or more channels simultaneously.

An exemplary implementation of the invention is given here below.

On the Interrogator Side:

The pulses of the message header are modulated as a function of the chosen channel. The Mode 4 is considered to be a modulation-free channel.

On the Responder Side:

According to the prior art, the modulation of the pulses of the preamble may be determined in many ways, by the sampling of the signal by correlators positioned in series or in parallel. The modulation of the pulses of the header determines the interrogation reception channel as well as the enciphering algorithm to be taken into account. This information is corroborated by the information on the transmission characteristics of the channel, the spacing of the header pulses ($T_1$, $T_2$, $T_3$ in FIG. 2) and the spread of the data. At a given instant, these values are specific to the channel chosen.

What is claimed is:

1. A method of interrogation/response in an IFF communication system including encrypted IFF messages, the method comprising steps of:
   modulating a header of an associated interrogation message by using an orthogonal or substantially orthogonal modulation function;
   wherein a 16-bit Walsh sequence is used as the modulation function;
   sending the modulated header and associated interrogation message from an interrogator to a responder;
   detecting the modulation function used for the header at the responder; and
   determining an algorithm for decoding information contained in the associated interrogation message based on the detected modulation function.

2. The method according to claim 1, further comprising dynamically managing spread functions as part of the modulating step and programming several channels for sending Mode 5 interrogation messages.

3. The method according to claim 1, further including encrypting IFF messages using Mode 5 with different enciphering algorithms and/or different keys and Mode 4.

4. An interrogation/response system including an interrogator and responder for sending and receiving encrypted IFF messages, wherein the interrogator includes:
- a modulator configured to modulate pulses of a header of an associated encrypted interrogation message by an orthogonal or quasi-orthogonal modulation function, said modulation function indicating an attribute of the encryption used for the associated encrypted IFF message;
- wherein the modulation function is a Walsh modulation function;
- a sender configured to send the modulated header and associated encrypted interrogation message to the responder, and the responder includes:
- first determining portion configured to determine a spread function of the modulated pulses of the header, and
- a second determining portion configured to determine an appropriate algorithm to decode the information contained in the associated encrypted interrogation message based on the determined spread function.

5. The device according to claim 4, further comprising one or more correlators configured in the first determining portion to determine the spread function, said correlators being placed in series or in parallel.

6. The device according to claim 4, further comprising a processor included in the first determining portion to determine the spread function.

7. The device according to claim 4, further comprising a processor equipped with a software program to manage and generate several channels chosen as a function of interrogation/response needs.

8. The device according to claim 4, wherein the responder is equipped with a specific interface chosen as a function of interrogation mode.

* * * * *